Figure 1:
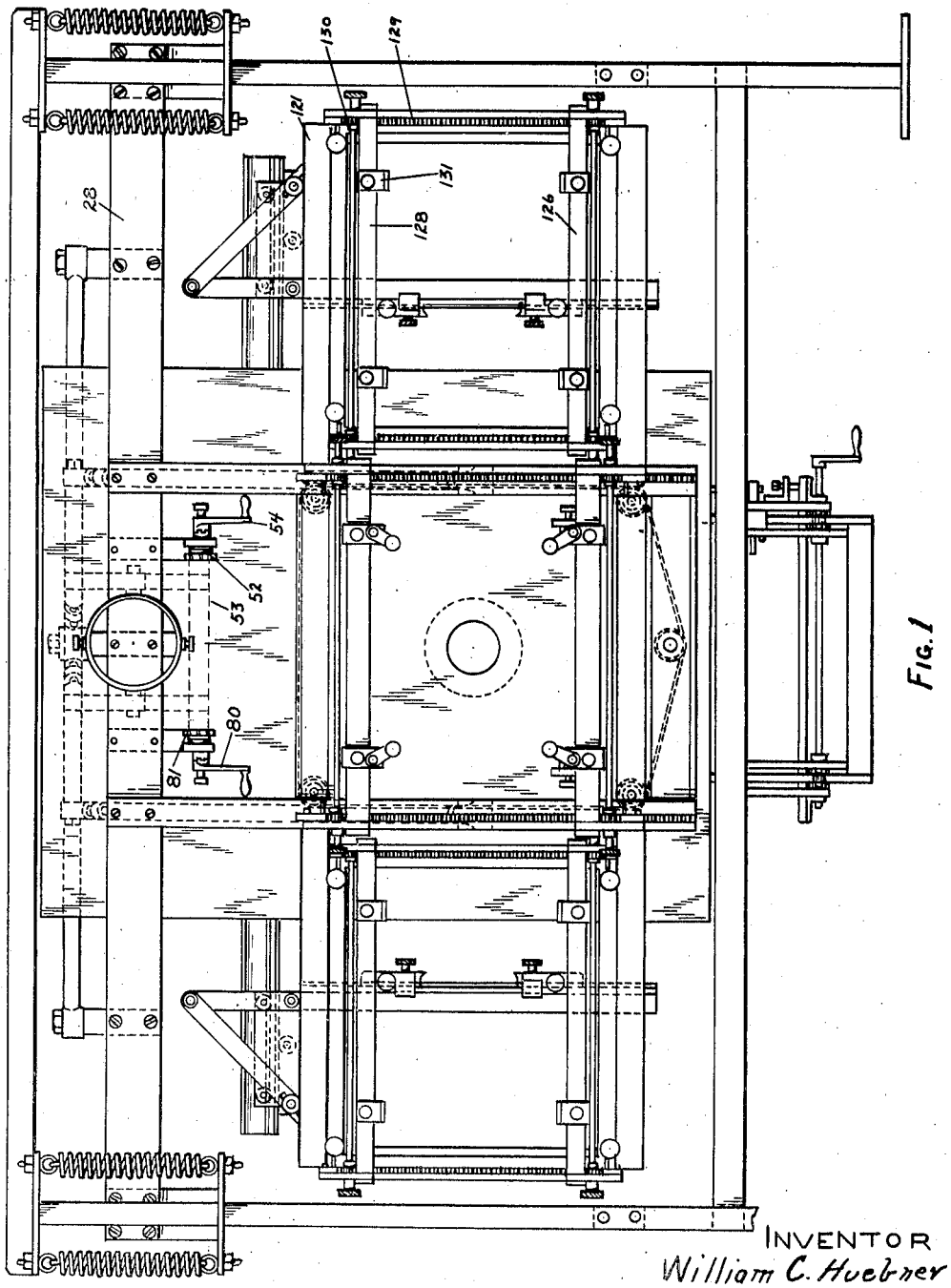

March 21, 1939. W. C. HUEBNER 2,150,974
CAMERA
Filed Aug. 31, 1936 9 Sheets-Sheet 1

INVENTOR
William C. Huebner
BY Joseph Harris
his ATTORNEY

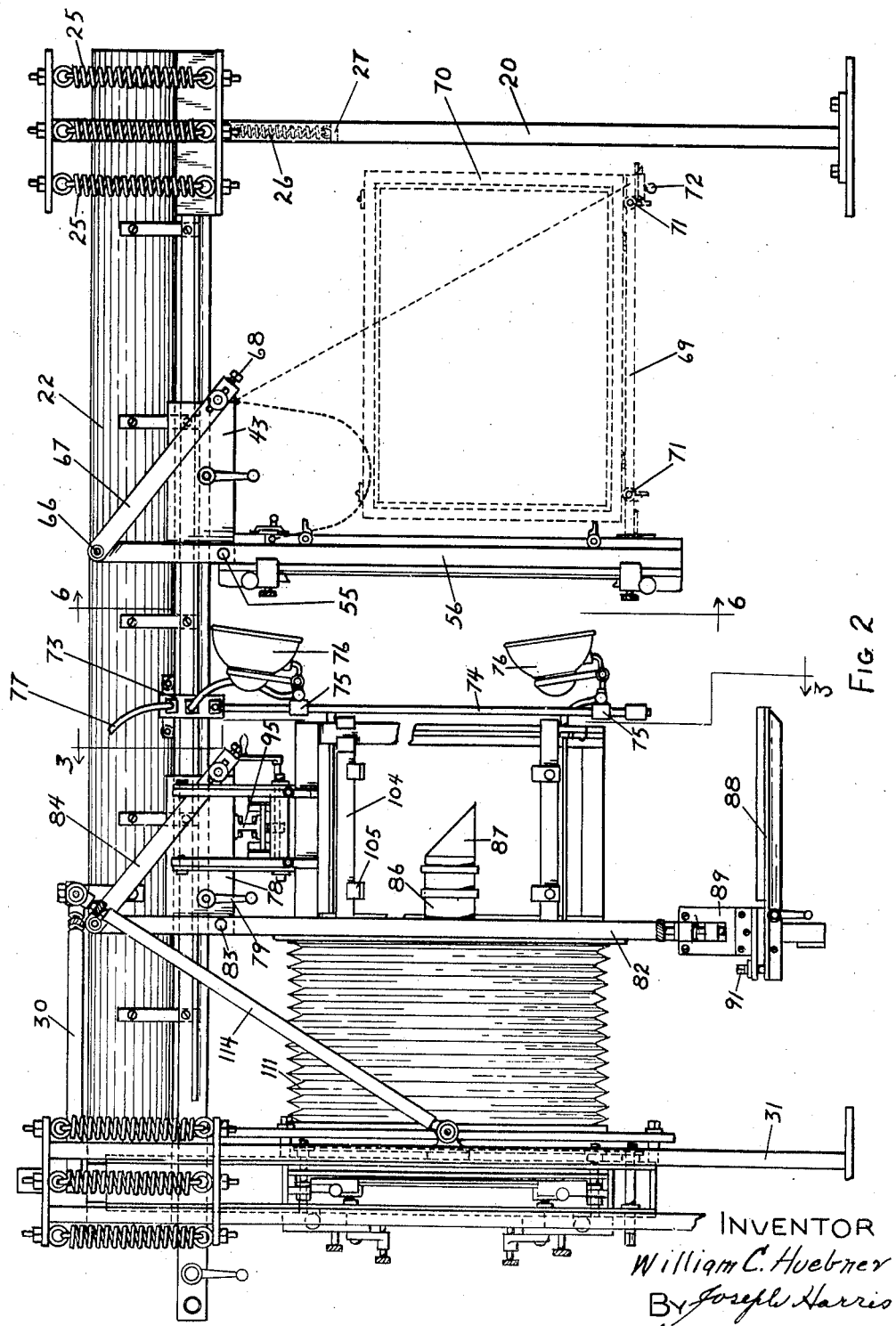

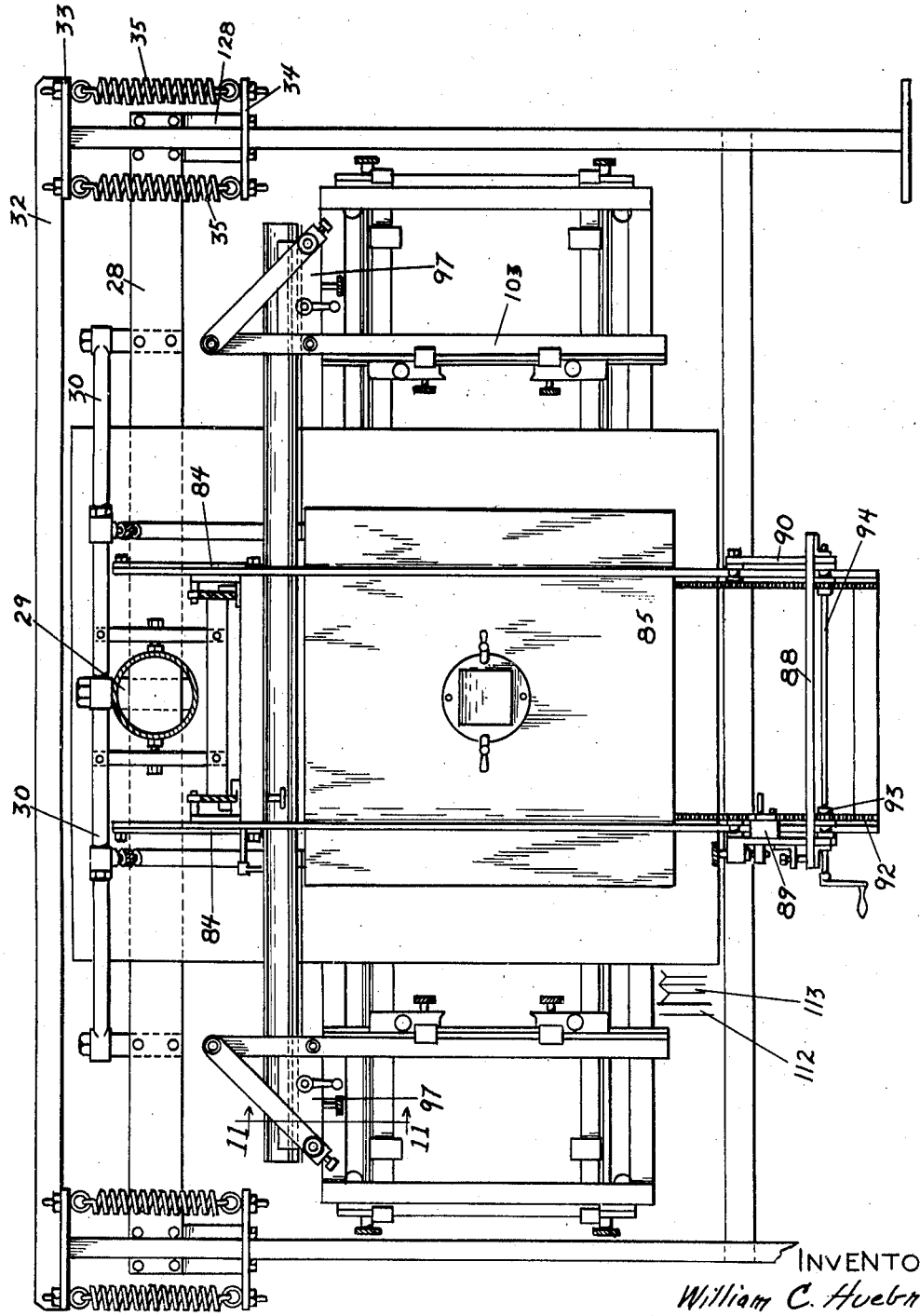

March 21, 1939. W. C. HUEBNER 2,150,974
CAMERA
Filed Aug. 31, 1936 9 Sheets-Sheet 4
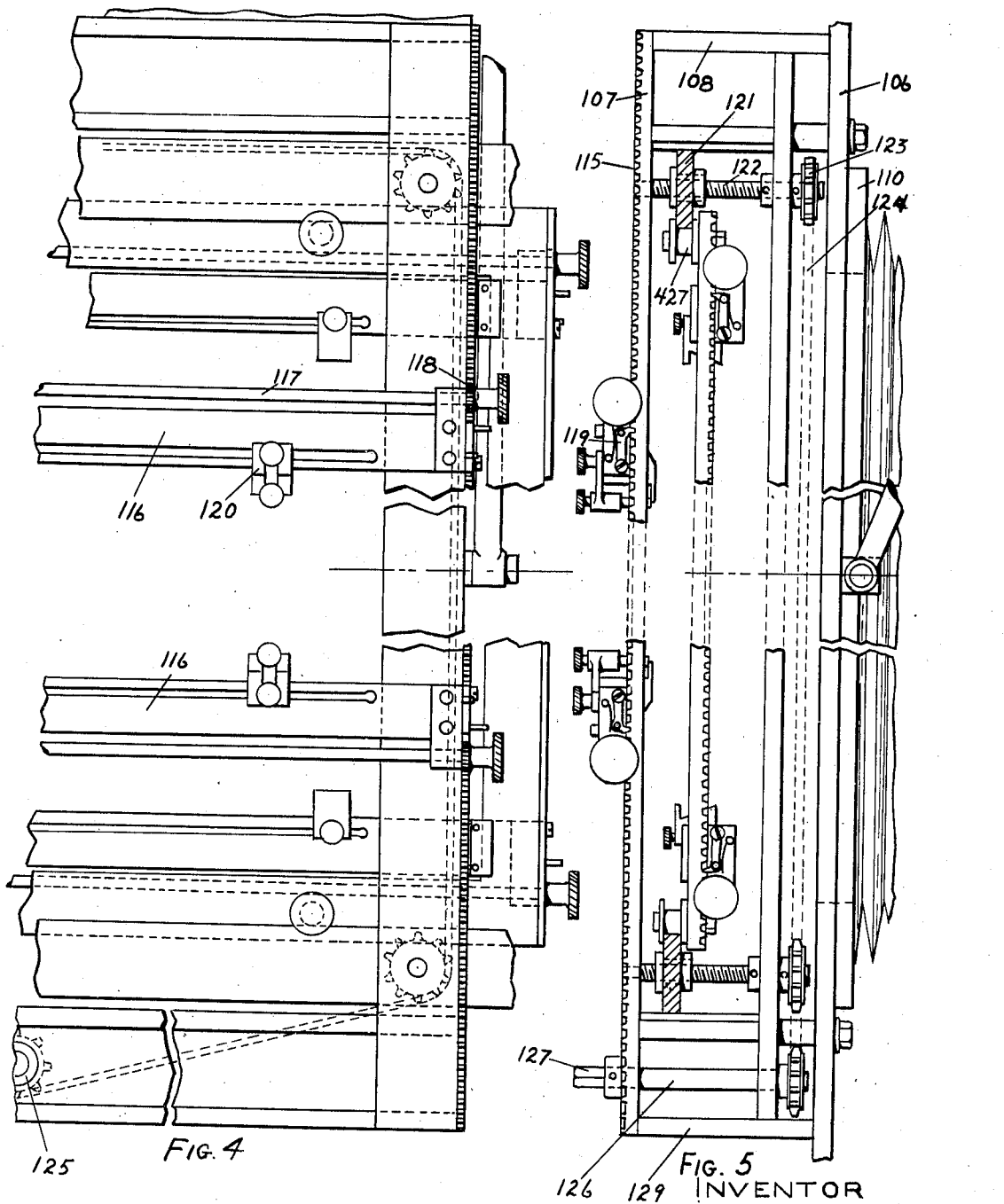
INVENTOR
William C. Huebner
BY Joseph Harris
his ATTORNEY March 21, 1939. W. C. HUEBNER 2,150,974
CAMERA
Filed Aug. 31, 1936 9 Sheets-Sheet 5

INVENTOR
William C. Huebner
By Joseph Harris
his ATTORNEY

March 21, 1939.    W. C. HUEBNER    2,150,974
CAMERA
Filed Aug. 31, 1936    9 Sheets-Sheet 6

INVENTOR
William C. Huebner
BY Joseph Harris
his ATTORNEY

March 21, 1939. W. C. HUEBNER 2,150,974
CAMERA
Filed Aug. 31, 1936 9 Sheets-Sheet 7

INVENTOR
William C. Huebner
BY Joseph Harris
his ATTORNEY

March 21, 1939. W. C. HUEBNER 2,150,974
CAMERA
Filed Aug. 31, 1936 9 Sheets-Sheet 9

INVENTOR.
William C. Huebner
BY Joseph Harris
his ATTORNEY

Patented Mar. 21, 1939

2,150,974

UNITED STATES PATENT OFFICE 2,150,974

CAMERA

William C. Huebner, New York, N. Y.

Application August 31, 1936, Serial No. 98,690

12 Claims. (Cl. 88—24)

This invention relates to improvements in cameras and more especially, but not exclusively, cameras for obtaining photo mechanical color separation negatives such as utilized in photo mechanical printing processes.

Cameras of the class referred to are necessarily of large size and the parts of heavy construction. As heretofore designed, such cameras because of their size, heavy parts and necessity of providing for relative adjustment between the copy board, lens and negative, have been more or less unsatisfactory because of the distortion or twisting of some of the parts under varying adjustments, thus producing mis-alinement or non-parallelism between the surfaces of the negative, lens and copy. Even though the distortion or twisting in the machine may be relatively minute, any such inaccuracy is sufficient to distort the photographic image enough to make the press plates ultimately derived therefrom more or less imperfect and untrue, particularly in color work where the several series of color separation negatives must be made extremely accurate.

One object of this invention is to provide a camera of the class indicated with the parts so constructed and arranged as to eliminate any mis-alinement or non-parallelism between the copy, lens and negative, regardless of the relative positions occupied by those three parts in the camera.

Experience has shown that cameras of the class hereinbefore referred to are subject to vibrations such as transmitted by heavy vehicular traffic to the buildings in which the cameras are located and to heavy machinery in operation in the same building, such as printing presses. Unless such vibrations are dampened or eliminated, a blurred effect in the photographic negative may occur. Another object of the present invention, therefore, is to so mount and support the several parts of the camera as to eliminate or prevent the transmission of vibrations from outside sources to the copy holder, lens, negative supporting means and auxiliary devices.

To accomplish the object indicated in the preceding paragraph, the invention contemplates the use of a main frame yieldingly or resiliently supported and which frame in turn carries or supports the copy holders, lens, negative supporting means and auxiliary devices. Furthermore, in carrying out this feature of the invention, the several holding means for the copy, lens, negative and auxiliary devices, such as the screens, are made to depend or extend downwardly from the horizontally supported main frame, and another object of the invention is to so arrange the points of support or suspension of the main frame that twisting, warping or weaving of said frame that might otherwise result from relative shifting of the holding means parallel to the axis of the camera or of any of the parts transversely of said axis, are eliminated or so minimized as to prevent misalinement or non-parallelism of the copy, lens and negative.

Heretofore, particularly in large printing plants where cameras of the class indicated are used, it has been found necessary, from a practical standpoint, to employ two or three cameras in order to make the necessary negatives for all classes of work encountered, since, as heretofore constructed, each camera has been designed for only a limited class of work.

Still another object of this invention therefore is to provide a camera such that negatives may be made for all classes of work such as paintings, copy boards, flexible copies, objects which cannot be fastened to the usual vertical copy board such as jewelry, shoes, gloves and the like and, in fact, any article which it may be desired to photograph.

A specific object of this invention is to provide a camera of the character indicated wherein all the necessary adjustments for focusing, enlarging, screen distances and the like may be effected by the operator from his one position in the dark room end of the camera.

A still further object of the invention is to provide a camera of the class referred to, so constructed and arranged that a greater variety of work and of better quality may be done in less time and at lesser cost than has been possible heretofore.

Other objects of the invention will more clearly appear from the description and claims hereinafter following.

Figure 6:
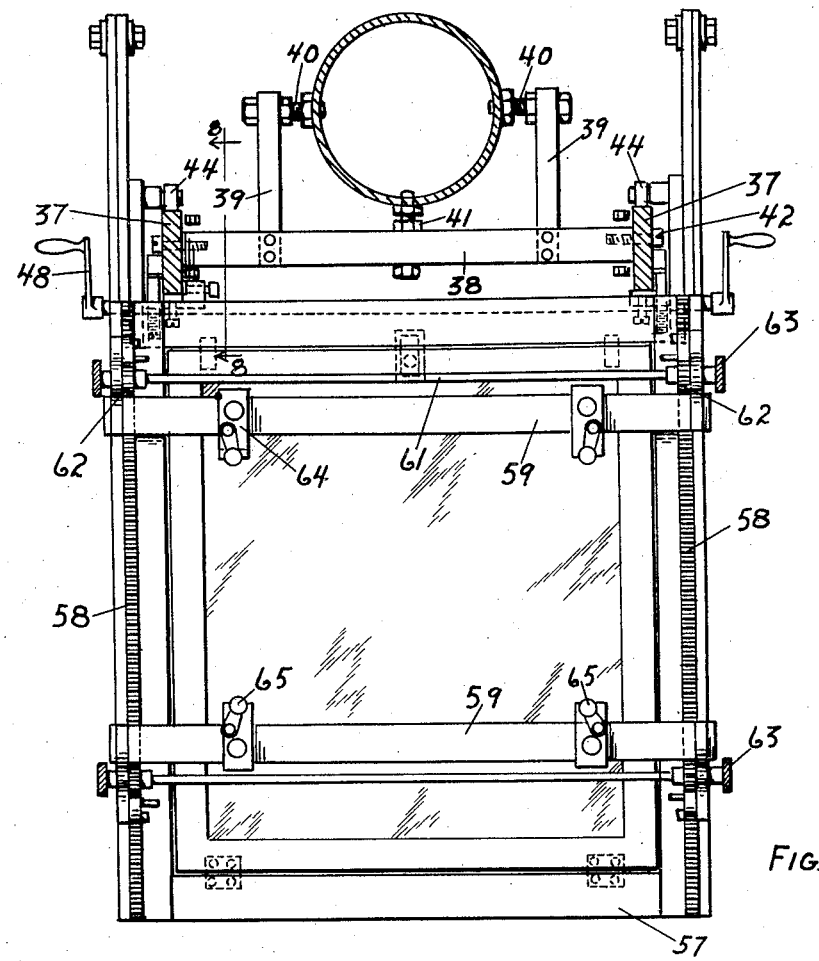
Figure 7:
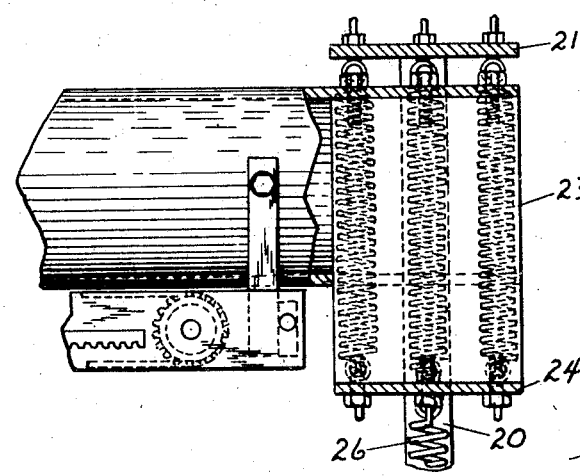
Figure 8:
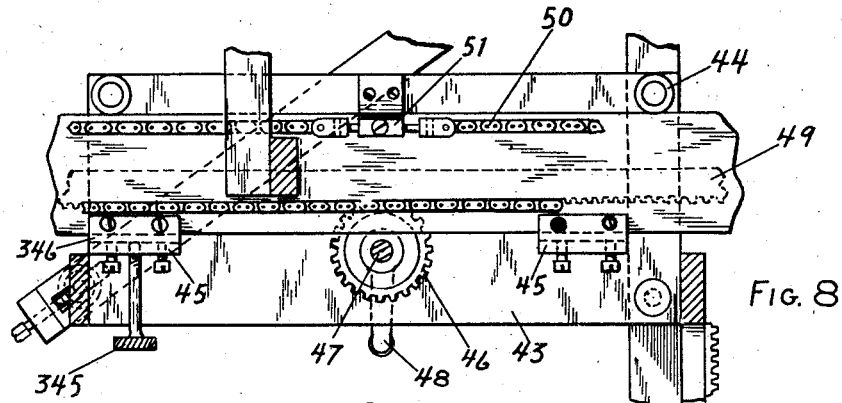
Figures 9, 10:
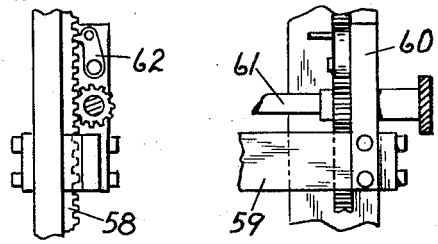
Figure 11:
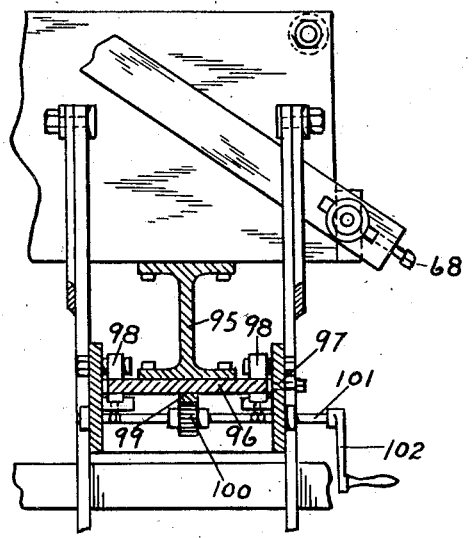
Figure 12:
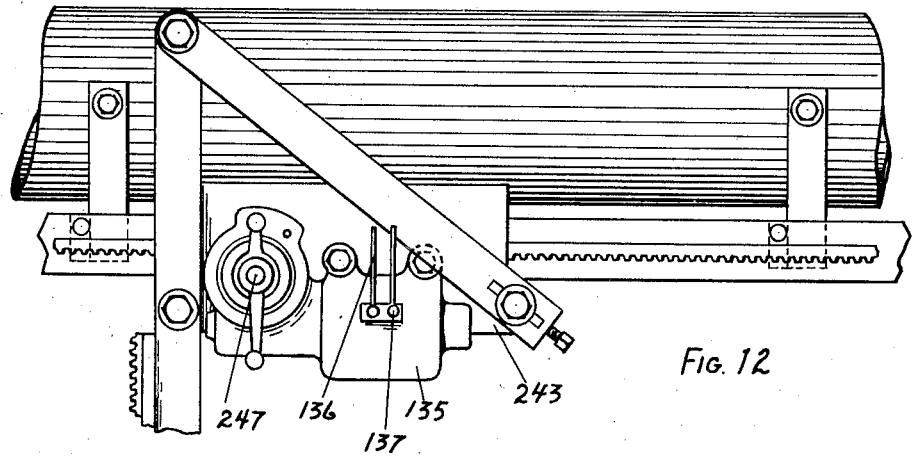
Figure 13:
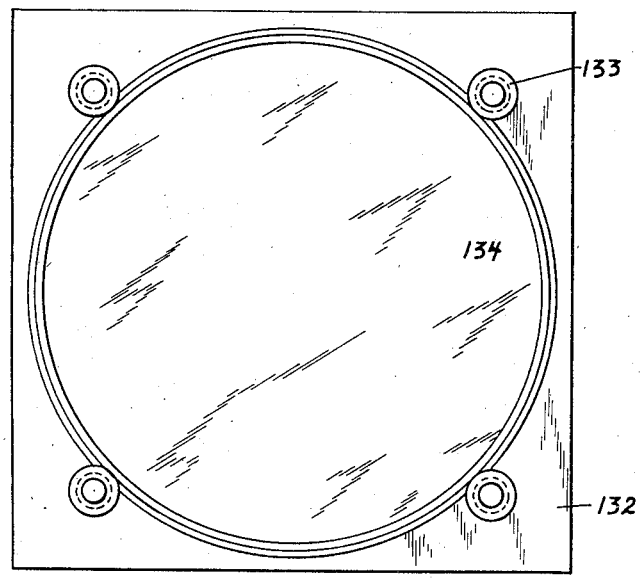
Figure 14:
Figure 15:
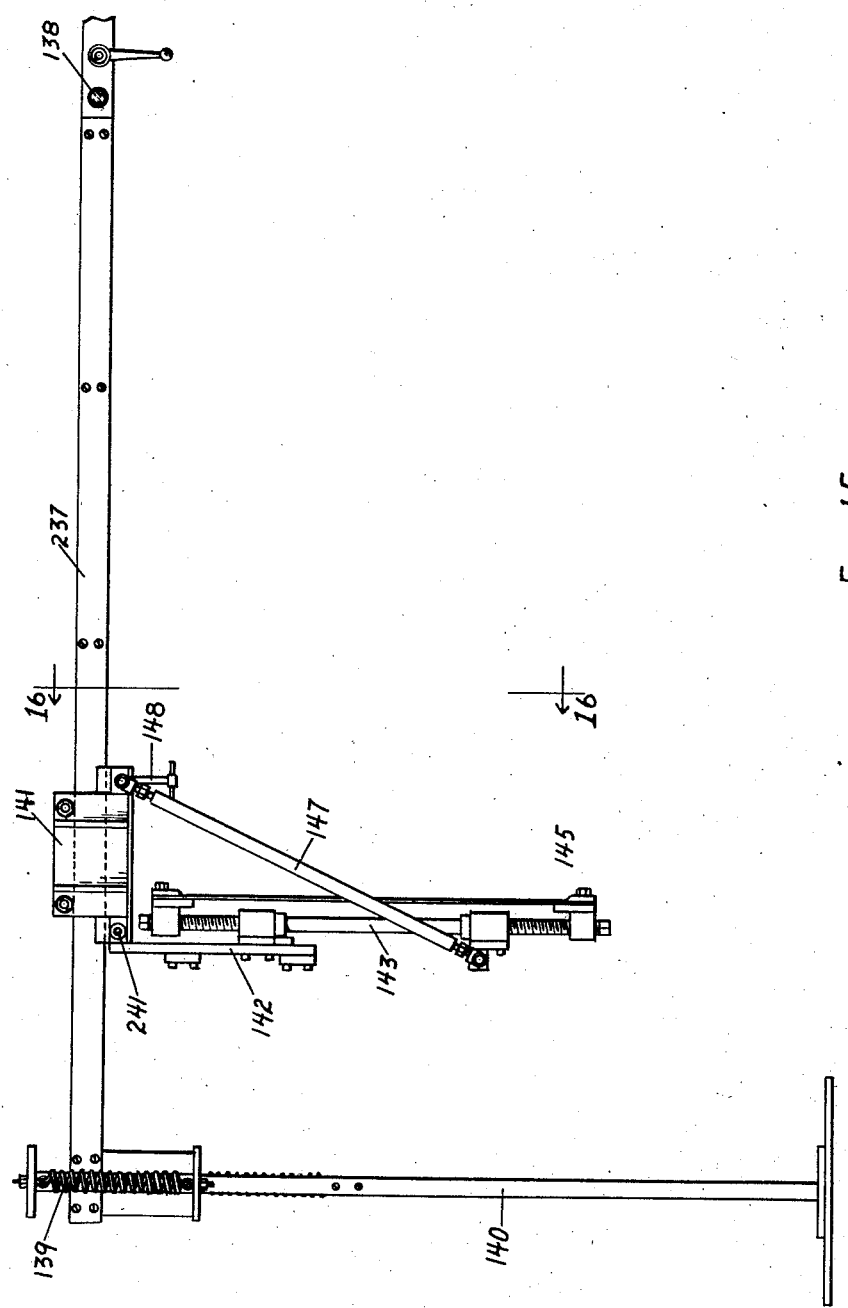
Figure 16:
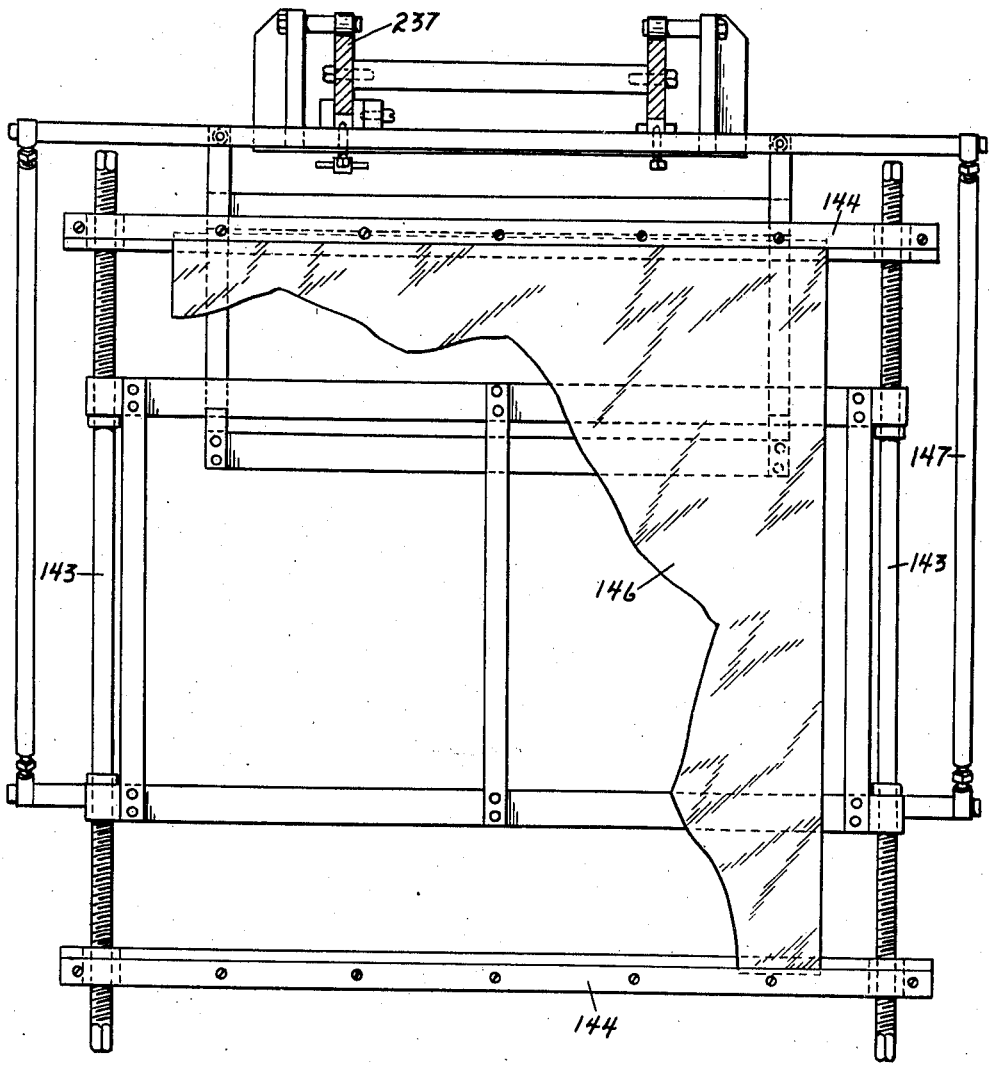

In the drawings forming a part of this specification, Figure 1 is an end elevation of a camera having the improvements embodied therein, the elevation being taken at the dark room end of the camera with certain parts omitted to more clearly illustrate the invention. Figure 2 is a side elevational view of the camera shown in Figure 1. Figure 3 is a transverse, vertical, sectional view corresponding substantially to the line 3—3 of Figure 2. Figure 4 is a broken elevational view upon an enlarged scale, showing certain features of construction of the means for holding the negative and for holding a screen. Figure 5 is a view at right angles of the construction shown in Figure 4. Figure 6 is a transverse vertical sectional view, upon an enlarged scale, corresponding substantially to the line 6—6 of Figure 2. Figure 7 is a part elevational view, part longitudinal sectional view, of a portion of the overhead frame showing more particularly the manner of supporting the same. Figure 8 is a broken longitudinal sectional view, upon an enlarged scale, corresponding substantially to the line 8—8 of Figure 6. Figures 9 and 10 are broken detail views, at right angles to each other, illustrating certain features employed on the copy holder. Figure 11 is a vertical sectional view, upon an enlarged scale, corresponding substantially to the line 11—11 of Figure 3. Figure 12 is a broken elevational view, showing portions of the backbone of the supporting frame and copy carriage having embodied therein a modification hereinafter described. Figures 13 and 14 are front and side elevational views, respectively, of the screen and holder therefor adapted to be employed in the improved camera. Figure 15 is a side elevational view of an extension and associated parts for obtaining enlargements, the extension being located at the dark room end of the camera and constituting a continuation to the left, in effect, of Figure 2. And Figure 16 is a vertical transverse sectional view, upon an enlarged scale, corresponding substantially to the line 16—16 of Figure 15, parts being broken away to more clearly illustrate the construction.

Referring first to the main framework of the camera, as shown best in Figures 1, 2, 3 and 7. As shown, the adjustable parts of the camera are carried by a frame having what may be termed a three-point spring suspension or support. At the copy end of the camera, or right hand end as viewed in Figure 2, a standard 20 is supported on the floor of the building or other suitable foundation, said standard 20 preferably consisting of a pair of laterally spaced commercial rolled sections which, at their tops, are connected by a transversely extending plate 21. Beneath the plate 21 and between the two uprights forming the standard 20 is loosely interposed what may be termed the rear end of a heavy, rigid tubular backbone 22 of the frame. Fixed within the tube 22 and extending downwardly therebelow for a short distance, as best shown in Figure 7, is a vertical plate 23 to the bottom end of which is secured a horizontally extending relatively wide plate 24, the latter being extended beyond the uprights and perforated so as to move freely vertically with respect thereto. Interposed between each extended end of the plate 24 and the top plate 21 are a series of coil springs 25, thus providing a yieldable spring suspension or support for the right hand end, as viewed in Figure 2, of the tubular backbone 22. To dampen any up and down oscillation that might be caused when the parts are adjusted on the backbone 22, one or more counterbalancing springs 26 may be interposed between said bottom plate 24 and a cross brace 27 on the standard 20.

At the dark room or left hand end of the tubular backbone 22, as viewed in Figure 2, a heavy cross-bar 28 is employed, the same being extended through the tube 22 and having a pivoted adjustable connection therewith through means of a heavy pivot stud 29. Said adjustable connection between the bar 28 and tube 22 is used in order that an absolute accurate positioning of the bar 28 at right angles to the tube 22 may be insured, and this result is accomplished through the medium of two diagonally extending adjustable connecting tubular rods 30—30.

The ends of the bar 28 are extended between spaced pairs of preferably rolled sections 31—31 at each side of the camera, which pairs of rolled shapes constitute two standards at the dark room end of the camera, and which in turn are supported on the floor of the building or other foundation. An arrangement similar to that previously described for supporting the free end of the tubular backbone 22, is employed for supporting each end of the heavy cross-bar 28. The two standards 31 are connected and braced by a top cross-bar 32 to the end of which are secured plates 33. Each end of the heavy cross-bar 28 has a downward extension 128 to which is connected a horizontal plate 34 having free slidable engagement with the members of the standard, said plates 33 and 34 being connected by coil springs 35—35. With the construction so far described, it will be seen that the camera is provided with a frame in the form of a large T, each of the three points of which, at the ends of the arms and stem of the T, is spring suspended or supported so that any extraneous shocks, jars or vibrations which may be transmitted to the three standards 20, 31 and 31 will be dissipated or absorbed in the three spring suspensions before they can be transmitted to the T frame and, since the lens, negative holder, copy holders and other associated parts, hereinafter described, are supported entirely from the T frame, vibrations or jars or shocks from external sources obviously cannot be communicated to them, thus eliminating one of the serious disadvantages inherent in prior types of cameras of the class in question.

To support the copy holders, lens, negative holders and associated parts from the T frame and provide for the necessary adjustments, two supporting tracks 37—37 are employed, one on each side of the tubular backbone 22. Said tracks are secured at intervals to cross bars 38, which in turn are connected by laterally spaced vertical bars 39—39 to the tube 22. Referring more particularly to Figure 6, it will be noted that the connections between the tube 22 and the individual supporting frames for the tracks 37 are made adjustable by the sets of three adjusting bolts 40—40 and 41 to thereby insure perfect horizontal positioning of the track supporting frames at all points along the tube 22. To further insure that each track 37 is truly horizontal throughout its length and to compensate for any slight bending because of the weight of the parts suspended from the tubular backbone 22, the tracks themselves may be adjusted vertically a slight amount with respect to the supporting bars 38, 39, by means of the track attaching screws 42 working through slightly vertically elongated slots provided in the tracks 37. As will be apparent to those skilled in the art, the backbone 22, because of its tubular and integral formation, is particularly efficient in resisting twisting or torsional strains as well as, for a given weight, in resisting downward bending moments.

As hereinbefore indicated, the several movable parts of the camera are supported from the T frame hereinbefore described. Reference will first be had to what may be termed the main copy or object holder, that shown at the right hand end of Figure 2, and illustrated also best in Figures 6, 8, 9 and 10. Said copy holder comprises a depending carriage 43 supported on the tracks 37 by rollers 44. Suitable guide blocks 45—45 may also be employed to maintain proper alinement of the carriage on the tracks. The carriage may be locked in adjusted position by a set screw 345 working through one of the blocks 45 to press a plate 346 against the bottom of one of the tracks 37.

Adjustment of the carriage 43 lengthwise of the tracks may be effected in either of two ways. One such means comprises pinions 46 carried by a transverse shaft 47 journaled in the carriage 43 and having crank handles 48 at each outer end. Said pinions 46 cooperate with racks 49 secured to the outer sides of the tracks 37. Said means just described are employed for adjusting the main copy holder when the operator is near the copy holder. The second means for adjusting the copy holder includes a sprocket chain 50 attached to the carriage 43 by a clip 51, said sprocket chain taking over an idler sprocket gear (not shown) at the right hand end of the tubular backbone 22, as shown in Figure 2, and also over a sprocket gear 52 (see Figure 1) located in the dark room. Said sprocket gear 52 is rotatably mounted on a transversely disposed journal 53 and is adapted to be actuated by a clutch crank handle 54.

Pivotally supported at each side of the carriage 43 on the pivot pins 55 and depending from the carriage, as shown in the drawings is the copy holder frame proper, the same including two vertically extending bars 56 connected at their bottoms by a cross bar 57. The vertical bars 56 (see Figure 6) are provided on the sides facing the lens, with vertical racks 58—58. Vertically slidably adjustable on the bars 56 are two holder bars 59—59 each of which is provided at its ends with a suitable journal and guide housing 60 in which is journaled a transversely extending shaft 61. Carried by each shaft 61 are pinions 62—62 cooperable with the racks 58 whereby each of the holder bars 59 may be adjusted vertically for paintings, copy boards or the like of different height. Each of the housings 60 also has pivotally mounted thereon a dog or latch 62 for retaining the holder bars in adjusted position as best shown in Figures 9 and 10. The shaft 61 may be provided with any suitable means for rotating the same, such as the knurled knobs 63—63. Horizontally slidably adjustable on the bars 59 are blocks 64 provided with suitable clips 65 for retaining the copy in position, it being evident that the arrangement described provides adjustable means for holding copy of different width and height.

It is highly essential that the copy holder be maintained in true vertical position, that is, in a plane parallel to the planes of the lens and negative. To insure this result, the pivotally supported bars 56 are extended upwardly and have pivotally connected thereto at 66 adjusting bars 67 which in turn, by means of pin and slot and screw 68 are adjustably connected at their opposite ends to the carriage 43. With this arrangement, planar position of the main copy holder can be adjusted to absolute accuracy.

To adapt the main copy holder for retaining flexible copies in position for photographing, the following arrangement is employed. Pivotally connected to the bottom bar 57 of the copy holder is an auxiliary board 69 to one longitudinal edge of which is pivotally attached a glass carrying frame 70, as shown in dotted lines in Figure 2, said frame 70 being in open position. In utilizing this feature of the invention, the thin flexible copy of paper, cloth or the like may be laid on the board 69 and the glass frame 70 then brought down and locked thereto by the latches 71—71. The board and frame 69—70 may then be swung up to vertical position against the main copy holder proper and latched in place by the spring latch indicated conventionally at 72. When in vertical position, the flexible copy will obviously be held flat in focal plane by the contacting surface of the glass plate which covers the copy and is then ready for exposure.

In order to obtain high illumination of any copy supported from the main copy carriage 43, a lamp carriage 73 may be mounted on the tracks 37, said carriage 73 having suspended therefrom a tubular rectangular framework 74, on the vertical side elements of which are adjustably mounted brackets 75—75 carrying lamps 76—76. Current is supplied to the lamps through a flexible cable 77.

Mounted on and depending from the tracks 37, similarly to the copy holder carriage 43, is a lens carriage 78, it being deemed unnecessary to describe the detail construction by which mounted on the tracks since the same will be similar to that of the carriage 43. Adjustment of the carriage 78 longitudinally of the tubular backbone 22 may be effected in the same two ways as for the carriage 43, the adjustment when the operator is standing adjacent the lens being through the crank handle 79 and in the dark room (see Figure 1) through the crank handle 80 and sprocket gear and chain 81, located on the opposite side of the tube 22 to that of the sprocket and chain 52—50 heretofore described in connection with the copy carriage 43.

The lens supporting frame proper indicated at 82 is similar to the copy carriage frame 56 and is pivotally connected to the carriage 78 at 83 and adjustable with respect to its vertical plane through similar adjusting links 84. The frame 82 carries a square lens board 85 on which is suitably mounted the lens 86 and a rotatably adjustable and detachable prism 87.

At its lower end the lens framework 82 supports a second horizontal copy or object holder, the same being indicated at 88 as best shown in Figures 2 and 3. The copy holder or board 88 is adjustably connected to slide blocks 89 and 90 adapted to move up and down on the side elements of the frame 82. To level the copy board 88, an adjusting screw 91 is interposed between the block 89 and the extended end of the copy board 88 to thereby insure the plane of the copy board being absolutely at right angles to the plane of the lens. The lens frame 82 is provided with racks 92 with which cooperate pinions 93 on a shaft 94 journaled in the housings 89—90 so that the copy board 88 may be adjusted up and down to the desired distance from the prism 87 and consequently focused with respect to the lens.

In addition to the horizontal copy or object holder 88 just described, the lens carriage 78 also supports two additional side copy boards or holders. Secured to the under side of the carriage 78 is a transversely extending I-beam 95 (see Figure 11). The latter has secured thereto on the under side a plate 96 which forms a track for two transversely adjustable carriages 97—97, as best shown in Figures 3 and 11, one carriage on each side of the camera. Each of said carriages is suitably supported by rollers 98—98 on the track plate 96 and is adjusted back and forth by means of fixed rack 99 and pinion 100 carried by the shaft 101 having a crank handle 102. Each carriage 97 is provided with a depending copy holding frame 103 pivotally supported and adjusted with respect to its carriage in the same manner as previously described for the main copy holder 56. Each side copy holder 103 is provided with vertically adjustable bars 104 carrying transversely adjustable clips 105 similar to the copy holder arrangement 56, 59, 64 previously described.

With the several copy holders described, it will be apparent that all classes of articles may be positioned with respect to the lens for photographing and, furthermore, may be photographed either directly in front of the lens, beneath the lens or at either side, it being understood that with respect to the horizontal copy holder and side copy holders, the prism 87 will be rotated to the desired position corresponding to the particular copy board which is being employed. The horizontal copy holder 88 is particularly adapted for articles such as jewelry, gloves, shoes and the like which cannot be properly mounted for photographing on a vertically disposed copy board. As will be evident, the prism arrangement permits of reversing the image on the sensitized negative, when the prism is employed although, when the main copy holder is being utilized, the prism will be removed. As will further be evident to those skilled in the art, the provision of the several copy holding-means, one in the axis of the lens and other or others to one side of the axis of the lens, readily permits of the independent photographing of two different images on the same or two different negatives as frequently required in producing a composition image as, for instance, in catalog work.

The negative and screen supporting arrangement will next be described, particular reference being had to Figures 1, 2, 4 and 5. Rigidly secured to the heavy cross plate 28 of the T frame and depending therefrom is a built-up framework of more or less box-like form, consisting of sets of vertical bars 106 and 107 suitably connected at their tops and bottoms by horizontal plates 108 and 109. Secured to the sides of the plates 106 nearest the lens, is a rectangular board 110. Between said board 110 and the lens carrying board 85 is the usual bellows 111 to permit of relative adjustment, as will be understood. In order to provide for the dark room and at the same time eliminate possibility of vibration being transmitted to the camera, said board 110 will be located in line with a room partition, a part of which is indicated by dotted lines 112 in Figure 3. Said room partition will be cut out so as to be spaced from the edges of said board 110 and extending between all edges of said board 110 and edges of the partition 112 will be provided a flexible suitable fabric 113 so as to effect a light type seal, preventing admission of light to the dark room end of the camera.

The framework 106, 107, 108, 109 is held in true vertical position by diagonally disposed adjustable bracing and connecting rods 114 at each side, the same extending from said framework to the tubular backbone 22, as best shown in Figure 2. In this manner perfect alinement is insured between the negative held by said framework, the lens and the copy holders, as will be understood.

The two vertical members 107 of the negative screen framework are provided with vertical racks 115 and vertically adjustably slidable on said members 107 are two jaw bars 116—116. Vertical adjustment of said bars 116 is effected through shafts 117 having pinions 118 cooperable with the racks 115. The bars 116 are held in adjusted position by suitable spring controlled dogs 119. Transversely adjustable on the jaw bars 116 are clip blocks 120 adapted to hold the negative in place, it being evident that the arrangement provides for adjustable means to accommodate varying size negatives.

In making negatives for producing photo mechanical printing plates, it is generally necessary to employ screens for making either line, halftone or grain negatives for use in lithographic, planographic, intaglio and relief negatives and positives. To permit of the use of such screens, the following arrangement is provided. Between the sets of vertical bars 106 and 107 are disposed two transversely extending rail or track plates 121, the same being extended a considerable distance to each side of the framework 106—107. Said plates 121 are mounted on horizontally disposed screws 122 in turn journaled in the negative screen framework. The screws 122, four in number, all carry sprocket gears 123 with which cooperates a sprocket chain 124 that takes over said sprocket gears and also over an idler sprocket gear 125 at the bottom of the framework. The idler gear is carried by a shaft 226 having a squared extension 127 so that, by rotating the shaft 226, the track plates 121 may be adjusted simultaneously and uniformly toward and from the negative to obtain the desired spacing of the screen which is supported on the track plates as about to be described.

Mounted on the plates 121 are two screen holding frames 126, each of rectangular form, one at each side of the camera, as shown in Figure 1. Each of said screen holding frames 126 is mounted on the plates 121 by rollers 427 so that the frames may be slid to a position either in line with the lens and negative or off to one side. Each frame 126 is provided with upper and lower jaw bars 128 vertically adjustable by a suitable rack and pinion arrangement 129 and 130 similar to those previously described in connection with the copy holders. The jaw bars 128 also carry horizontally adjustable retainer clips 131 for holding the screen holder proper 132 (see Figures 13 and 14). Each of the screen holders 132, as shown in Figures 13 and 14, is preferably provided with a series of grooved rollers 133 for retaining the screen 134 in place and allowing of rotation of the screen to the desired angle. With the arrangement just described, it is evident that two different kinds of screens may be used selectively and when either one of them is not being employed, it may be readily rolled back to non-operating position, thus eliminating the necessity of lifting and carrying screens as heretofore customary.

From the preceding description, it will be seen that the operator, when the copy has been placed in position on the main copy board, may effect all of the necessary adjustments for focusing and positioning of screen without leaving the dark room, thus decreasing the time and labor costs, as will be evident. The operator may also, if desired, effect the adjustments of the lens carriage and copy holder carriages outside of the dark room, should this be found desirable.

Referring to Figure 12, there is indicated conventionally another means of effecting adjustment of the main copy holder. In this modification, the carriage 243 has mounted thereon a motor 135 with a suitable reduction gearing between it and the gear shaft 247. By connecting the motor to a source of current through flexible connectors 136 and suitable push button connections 137 both on the motor and in the dark room (the latter push buttons not being shown), the carriage may be electrically controlled either from a position adjacent the carriage or in the dark room.

As will be evident to those skilled in the art, by providing the resilient three points of suspension or support at the ends of the arms and stem of the T-frame, as shown and described, danger of torque, weaving or twisting of the T-frame is eliminated. As either the lens holder or the copy holder or both are adjusted horizontally lengthwise of the stem of the T-frame, it is evident that the combined center of weight of all of the parts depending from the T-frame will also be shifted lengthwise of the T-frame stem. This shift of the center of weight is obviously accommodated without twisting or weaving of the T-frame, by the latter adjusting itself about a line or axis extending between the two sets of springs 35 at the ends of the arms 28 of the T-frame. Similarly, shifting of the screen holder or holders or of the side copy holders or both will result in a shift of the combined center of weight of all of the parts depending from the T-frame, horizontally and transverse of the axis of the camera. This shift in center of weight is readily accommodated without twisting or weaving of the T-frame by tilting of the T-frame about a line or axis extending lengthwise of the tubular backbone. Other relative changes in the positions of the lens holder, copy holders and screen holders, partly lengthwise and partly transverse of the axis of the camera, will obviously be readily accommodated by a free tilting of the T-frame partly about the line or axis of the tubular backbone and partly about the line or axis extending between the two sets of spring supports 35—35. By thus combining the resilient three point support described for the T-frame and supporting the lens and copy holding-means dependently from the stem of the T-frame and the negative and screen holders dependently from the cross arms of the T-frame, so that the adjustments of the lens and the copy holders are parallel to the stem of the T-frame and the adjustments of the screen holders parallel to the cross arms, the proper axial alinement of the copy, lens and negative may always be maintained regardless of the relative shifts of the several heavy parts of the camera dependently supported from the T-frame.

To provide for enlargements, the arrangement shown in Figures 15 and 16 is employed. Track extensions 237 are employed, the same being alined with the main tracks 37 and connected thereto as indicated at 138. Said track extensions are spring supported at their outer ends as by the springs 139 from a supplemental standard 140 in a manner similar to the spring suspensions hereinbefore described. Horizontally adjustable on the extension tracks 237 is a roller supported carriage 141 having a depending frame 142 pivotally connected to the carriage as indicated at 241. Journaled in the ends of the cross members of the frame 142 are two vertical adjusting screws 143—143, the same having threaded engagement at their upper and lower ends with two cross bars 144—144. The latter are provided with suitable clamping plates 145 by which the upper and lower edges of a negative, such as a flexible sensitized film 146, may be attached and drawn taut by properly rotating the screws 143. True vertical positioning of the frame 142 is obtained by adjustable bracing and connecting rods 147. The carriage may be locked in adjusted position by screw and block arrangement 148.

Although there has herein been shown and described what is now considered the preferred manner of carrying out the invention, the same is by way of description and not by way of limitation. As will be apparent to those skilled in the art, various changes and modifications may be made in many of the details of construction and arrangement of parts without departing from the spirit of the invention. All changes and modifications are contemplated that come within the scope of the claims appended hereto.

What is claimed is:

1. In a camera of the character described, the combination with relatively stationary supporting means; of a frame of generally T-form; resilient means interposed between said supporting means and said T-frame approximately at the ends of the two arms of the T and at the free end of the stem thereof, respectively, to thereby provide resilient supports at three points; copy-holding means, lens-holding means and sensitized element holding-means all supported and depending from said T-frame, said lens-holding means and copy holding-means being horizontally adjustable lengthwise of the stem of the T-frame and the sensitized element holding-means being located adacent said arms of the T-frame; a track, supported by and positioned below said T-frame adjacent said sensitized element holding-means at said arm end of the T-frame and extending horizontally and transversely of the stem of the T-frame continuously from one side to the other side of the lens axis; and means for holding a screen mounted on said track, said screen holding-means being movable relative to the T-frame horizontally and transversely of the stem thereof on said track from one side of the axis of the lens to the other side thereof whereby shift, lengthwise, transversely, or both, relative to the stem of the T-frame, of the effective center of weight of all of said holding-means, which are in a depending position with respect to said T-frame, is accommodated by said resilient three point support substantially without twisting of the T-frame.

2. In a camera of the character described, the combination with supports; of a main frame having a longitudinally extending backbone of tubular form; resilient means interposed between said supports and frame at three points, one of which is located substantially at one end of said backbone and the other two on opposite sides of and equi-distant from the backbone at the opposite end of the latter; copy holding-means and lens holding-means dependently supported from and each horizontally lengthwise adjustable of said backbone; sensitized element holding-means dependently supported from said frame approximately below the line between said two resilient means located on opposite sides of the backbone; and screen holding-means located adjacent said sensitized element holding-means and dependently supported from and horizontally transversely adjustable relative to the frame and from operative to inoperative positions relative to the lens and sensitized element.

3. In a camera of the character described, the combination with supports; of a main frame including a longitudinally extending tubular backbone and transversely extending arms at one end thereof; rails on opposite sides of and extending lengthwise of said tubular backbone; means adjustably attaching said rails to the tubular backbone; resilient means interposed between said supports and said frame approximately at the ends of said arms and the free end of the tubular backbone to thereby provide a resilient three point support; copy holding-means and lens holding-means each horizontally adjustable on said rails and depending therebelow; and sensitized element holding-means positioned below and supported from said transversely extending arms of the main frame.

4. In a camera of the character described, the combination with supports; of a main frame comprising a longitudinally extending backbone, a cross bar extending transversely of the backbone at one end thereof, a pivotal connection between said backbone and cross bar located at the center of the latter and adjustable connectors between the backbone and bar; resilient means interposed between said supports and frame approximately at the ends of said cross bar and free end of the backbone; sensitized element holding-means supported by said main frame adjacent the cross bar; and lens and copy holding-means supported by the backbone of the main frame.

5. In a camera of the character described, the combination with supports; of a main frame comprising a longitudinally extending tubular backbone, a cross bar extending transversely of the backbone at one end of the latter, a pivotal connection between said backbone and cross bar, and adjustable connectors between the backbone and cross bars; rails extending lengthwise of said tubular backbone and adjustably secured thereto on opposite sides thereof; resilient means interposed between said supports and frame approximately at the ends of said cross bar and free end of the backbone; copy holding-means and lens holding-means each adjustable on said rails and depending therebelow; and sensitized element holding-means positioned below and supported from said cross bar.

6. In a camera of the character described, the combination with supports; of a main frame comprising a longitudinally extending backbone and a transversely extending cross bar at one end of the backbone; of spring means operatively interposed between said supports and frame approximately adjacent the ends of the cross bar and free end of the backbone, respectively; lens holding and copy holding-means dependently supported from said backbone of the frame and adjustable lengthwise of the latter; a combined sensitized element holder and screen holder sub-frame rigidly secured to and depending from said cross bar; a track mounted on said sub-frame and extending uninterruptedly horizontally and transversely of the backbone from one side to the other side of the lens axis; means for adjusting said track as an entirety toward and from the sensitized element holding-means; and a screen holder mounted on said track and adustable horizontally thereon transversely of the backbone of the frame.

7. In a camera of the character described, the combination with supports; of a main frame comprising a longitudinally extending backbone and a transversely extending cross bar at one end of the backbone; of spring means operatively interposed between said supports and frame approximately adjacent the ends of the cross bar and free end of the backbone, respectively; lens holding and copy holding-means dependently supported from said backbone of the frame and adjustable lengthwise of the latter; a combined sensitized element holder and screen holder sub-frame rigidly secured to and depending from said cross bar; a track mounted on said sub-frame and extending horizontally and transversely of the backbone to both sides thereof; means for adjusting said track toward and from the sensitized element holder; and a pair of screen holders supported on said track, each screen holder being adjustable on said track to an operative position in line with the lens and to an inoperative position to one side.

8. In a camera of the character described, the combination with a main frame having a longitudinally extending backbone and a cross arm at one end thereof; of sensitized element holding-means mounted on said frame substantially in line with said cross arm; lens holding-means mounted on said frame and adjustable lengthwise of the backbone thereof; a horizontally disposed track, located adjacent said sensitized element holding-means and between the latter and the lens, carried by said frame and extending transversely of the lens axis; a screen holder mounted on said track and horizontally slidable, while always supported on said track, into and out of focal position; a copy holding-means supported from said frame and located in the axis of the lens, said means being adjustable lengthwise of the backbone of the frame toward and from the lens; and a second copy holding-means supported from and vertically adjustable on said lens holding-means, said second copy holding-means being horizontally disposed below the axis of the lens.

9. In a camera of the class described, the combination with a frame of approximately T-form; of resilient means for supporting the frame; copy-holding and lens-holding means carried by and depending from the stem of the T-frame, each of said means being independently adjustable horizontally and lengthwise of said stem; a sub-frame fixedly carried by said T-frame extending transversely of said stem and depending from the frame adjacent the arms of the T-frame; sensitized element-holding means on said sub-frame; a track on said sub-frame extending horizontally and also transversely of said stem and continuously from one side to the other side of the axis of the lens; and screen-holding means mounted on said track and movable thereon transversely of said stem to inoperative position at either side of the axis of the lens and to operative position in line with the axis of the lens.

10. A camera in accordance with claim 9 having means for adjusting said track as an entirety toward and from the sensitized holding-means while the screen-holding means is mounted on said track.

11. In a camera of the class described, the combination with a main frame; of resilient means for supporting the frame; copy-holding and lens-holding means dependently supported from said frame and independently adjustable lengthwise thereof; a sub-frame depending from said main frame and extending transversely thereof; means on said sub-frame for supporting a sensitized element in line with the axis of the lens; a track on said sub-frame also extending transversely of the main frame and uninterruptedly from one side to the other side of the axis of the lens; means for supporting a screen, said means being movably mounted on said track and adjustable thereon horizontally and transversely of the axis of the lens from operative to inoperative position relative to the lens and means for holding the sensitized element; and means for adjusting said track while the screen-holding means are in any position thereon, toward and from the means for holding the sensitized element in a direction parallelling the axis of the lens.

12. In a camera of the character described, the combination with a frame having a main longitudinally extending member, extension means in line with and united to one end of said main member, and a member extending transversely of the main member substantially at the junction of said main member and extension means; of resilient means for supporting said frame, said resilient means being respectively located adjacent the respective free ends of the combined main member and extension means and also at the ends of said transverse member; copy-holding and lens-holding means supported by said main member and adjustable lengthwise thereof; means for holding a sensitized element, said means being supported by the frame adjacent said transverse member; a track supported by said frame adjacent said means for holding the sensitized element and located between the latter and the lens-holding means; means for adjusting said track toward and from the means for holding the sensitized element; a screen holder supported on said track and movable thereon horizontally and transversely of the axis of the lens into and out of operative position relative to the lens and means for holding the sensitized element; and enlargement sensitized element-supporting means mounted on said extension means and adjustable horizontally in a direction parallelling the axis of the lens.

WILLIAM C. HUEBNER.